July 27, 1943.  C. AUTH  2,325,095
DIRECTORY AND PUSH-BUTTON CALL-BOARD DEVICE
Filed Aug. 9, 1940  2 Sheets-Sheet 1
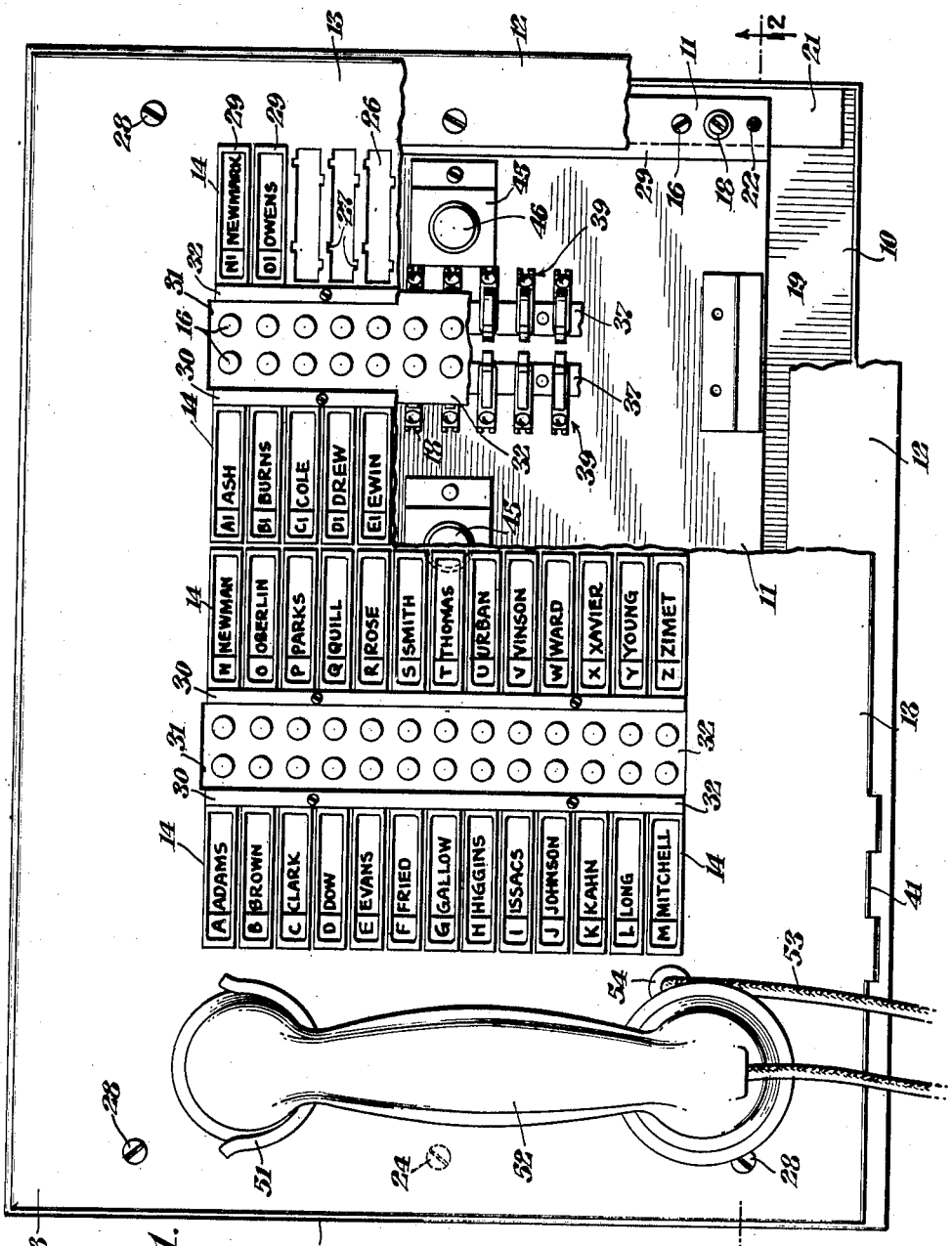
INVENTOR
Charles Auth
BY
his ATTORNEYS

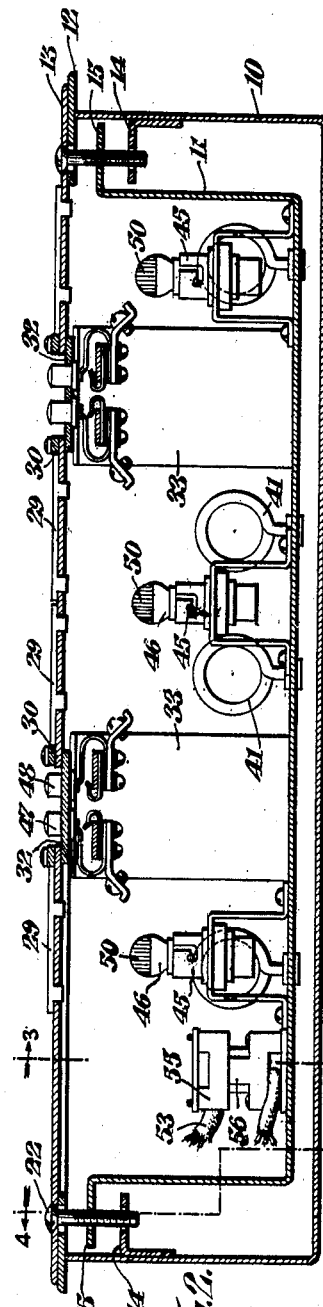

Patented July 27, 1943

2,325,095

UNITED STATES PATENT OFFICE 2,325,095

DIRECTORY AND PUSH-BUTTON CALL-BOARD DEVICE

Charles Auth, Malba, N. Y.; Emma L. Auth executrix of said Charles Auth, deceased Application August 9, 1940, Serial No. 351,932

2 Claims. (Cl. 175—307)

This invention pertains to directory and push-button call board devices, such as are provided at the entrances to apartment buildings and the like, whereby a caller may locate, signal and communicate with a desired occupant.

Such devices ordinarily comprise a sheet metal outlet box supported by metal conduit in a wall of the building and into which the electrical wiring for push-button signaling, telephone communication, etc., extends from the conduit. The box is closed by a more or less decorative panel, substantially flush with the wall and bearing the directory indicia, push-buttons, etc., etc.

Ordinarily, the outlet box proper is permanently installed along with the conduit in course of construction of the building and prior to plastering the wall. After plastering, the panel may be secured, as by means of screws, directly to the box, for example to angles or lugs welded to its inner sides. Upon installation of the panel, the wall may be finished as desired, such as by painting, etc., so that the wall finish extends to the edges of the panel. The practice in prior constructions is to mount directly on the underside of the panel, all apparatus other than the wiring, such as the push-button assemblies, wiring terminals, etc.

Such construction and arrangement are, however, subject to numerous objectionable and disadvantageous features, which it is an object of the present invention to overcome. Owing to installation of the outlet box as aforesaid and prior to plastering, the box is apt to be installed somewhat askew so that its edges are not uniformly flush with the finished wall or square and true with respect to the vertical and horizontal. Accordingly, when the panel is installed, it likewise will be correspondingly skewed owing to its attachment directly to the outlet box, and hence will not necessarily be flush with the wall along all edges or square and true with respect to the horizontal and vertical.

Also since the edges of the panel overlie the wall proper, it is practically impossible to remove the panel for purposes of repair, change of wiring, etc., without marring the surrounding wall finish, particularly where, as often occurs, the panel must be pried loose after removing the screws, whereby chipping and spalling of the plaster and finish results.

Again the practice of mounting of the wiring terminals, push-button assemblies, etc., on the panel, provides an extremely cumbersome and unnecessarily expensive arrangement as regards both installation and repairs. Such apparatus renders the panel unduly heavy and cumbersome to handle. Since all wiring must extend to the panel, connections cannot be completed until the building is finished, the panel must be loosely supported while connections are made, the panel after wiring cannot be completely removed from the outlet box, and an excess of loose wire must be provided to permit even limited removal. Also replacement of a panel necessitates complete rewiring, etc.

In accordance with the present invention, the above objectionable features are eliminated and an otherwise improved construction is obtained by mounting the terminal apparatus, such as the wiring terminals, push-button assemblies, etc., upon a cradle or chassis which is separate and distinct from the outlet box and panel, this cradle or chassis being arranged to fit within the outlet box and to be detachably secured thereto, as by means of screws. There may also be provided a separate molding, trim or marginal frame of sheet metal which is attachable to and carried by the cradle, this trim being constructed to cover the otherwise exposed edges of the outlet box and to overlie the surrounding wall. The cradle or chassis is so mounted within and attached to the outlet box by means of a series of attaching and supporting screws, as to be adjustable in both angular inclination and in depth or elevation with respect to the side walls and base of the outlet box, thereby to permit of so adjusting the cradle that the molding or trim will lie flush with the wall with its edges in proper vertical or horizontal alignment, and this irrespective of any skewness present in the mounting of the outlet box proper. The panel in turn may be secured either to the metal trim either by hinges or screws, or may be secured directly to the cradle by screws passing through holes drilled in the trim. With either arrangement, however, the panel will automatically assume its proper position in conformity with the positioning of the cradle and trim. In so far as the proper positioning of the panel is concerned, the metal trim may be omitted by mounting the panel directly on the cradle, but the advantage of the trim is that it prevents marring the wall upon removing the panel, since the panel rests upon the trim rather than on the wall, the trim being left permanently in position.

In addition to its function of providing proper support and positioning of the trim and panel, the cradle has the further function of supporting the terminal apparatus, i. e., wiring terminals, push-button assemblies, etc., whereby all wiring connections to the panel are eliminated so that the latter may be completely, easily and quickly removed for purposes of repair or the like. It will be understood in this connection that once the cradle or chassis is installed, there is no necessity for removing it, its construction being such, as explained below, that all wiring connections or other changes can be made with the cradle in position. Accordingly, the cradle can be installed and the wiring connections made thereto at the time the wiring is pulled through the conduit or at any time thereafter, but can be subsequently adjusted when the wall is finished to properly position the trim and panel with respect thereto.

The invention is admirably adapted to illumination of the directory indicia and of the push-buttons from the rear side of the panel. To this end, the indicia and push-buttons may be made translucent, illumination being provided by electric lamps mounted on the cradle. Or opaque push-buttons may be employed and the panel provided with appropriate slits of translucent material adjacent thereto for providing side illumination of the buttons. No difficulty is encountered in lamp replacements with such constructions owing to the ease of removing the panel.

These and other features of the invention will now be described more in detail with reference to the drawings, wherein:

Fig. 1 is a plan view of the panel side of the device in elevation with a portion broken away to show the cradle, trim and outlet box assembly. Fig. 2 is a section at 2—2 of Fig. 1, while Figs. 3 and 4 are sections at 3—3 and 4—4 respectively of Fig. 2. Fig. 5 is a sectional detail corresponding to the right hand portion of Fig. 4 illustrating the adjustment of the cradle or chassis in relation to the outlet box. Fig. 6 is an enlarged sectional detail of a pair of the push-button assemblies and associated directory indicia corresponding to the Fig. 2 showing thereof, this view illustrating the use of both translucent and side illuminated, opaque push-buttons.

Referring to the drawings, the device comprises generally a rectangular outlet box 10, a substantially channel-shaped cradle or chassis 11 fitting therein, a rectangular molding, trim or marginal frame 12 overlapping the upper edges of the outlet box side walls, and a rectangular panel 13 resting on the trim. Welded or otherwise secured to the inner side walls of the outlet box are angle bars 14 on which the cradle 11 is adjustably supported. To this end, the cradle is provided at its opposite sides, with flanges 15 adapted to overlie the angle bars 14, as shown in Fig. 1. Threaded through the flanges 15, as shown in Figs. 4 and 5, are screws 16, the lower ends of which rest on the angle bars 14 for supporting the cradle thereon in adjustable elevation. Also passing loosely through enlarged apertures 17 in flanges 15, are other screws 18, which are threaded through the angle bars 14, and which serve to secure the cradle to the angle bars and hence to the outlet box. By appropriate adjustments of the supporting screws 16, the channel member 11 may be supported at a desired height or elevation at each of its corners in the outlet box 10, and at a desired inclination with respect to the base thereof, the latter as indicated in Fig. 5. Likewise by virtue of the enlarged holes 17 in the flanges 15, the cradle 11 can be given a desired angular setting with respect to the side walls of the outlet box prior to tightening up on screws 18, following which these screws may be tightened to permanently maintain the adjustments above discussed.

The trim or molding 12 is secured to the cradle 11, by means of screws 19, Fig. 4, which pass loosely through apertures 20 of the trim and are threaded through the flanges 15 of the chassis, the angles 14 being provided with enlarged apertures 21 through which the lower ends of screws 19 may project. The panel is also secured preferably to the chassis 11 by means of screws 22 which pass loosely, Fig. 4, through aligned apertures of the panel and trim and are threaded into the chassis flanges 15.

It will be apparent therefore that the positions assumed by the trim and panel are determined by the position to which the cradle is adjusted in relation to the outlet box as above explained, and that in this way the trim can be adjusted flush with the wall and the edges of the trim and panel aligned with the horizontal and vertical directions, i. e. "squared up," and this irrespective of the skewness of the outlet box.

The directory indicia are mounted on the panel and are preferably arranged for illumination from the underside thereof. To this end, directory strips 23 are employed consisting for example, as shown in Fig. 6, of a strip 24 of light transmitting Bakelite cemented to a thinner strip 25 of opaque Bakelite, the opaque strip being engraved through in accordance with an apartment designation, so that light will be transmitted only through the engraved portions.

To permit of illuminating the directory strips from the rear side of the panel, the latter is provided with rows of rectangular apertures, such as 26, Fig. 1, provided with laterally disposed notches 27, for reception of bent over lugs, as at 28, Fig. 6, of slotted sheet metal housings 29 provided on the front side of the panel, and into which the directory strips 23 may be slid endwise and held in place by means of strip members, such as 30, abutting the ends of the housings 29 of the directory strips 23.

The panel is also provided adjacent the rows of directory strips with relatively large rectangular apertures, as at 31, which are closed by separate panel members, such as 32, on which the push-button assemblies are mounted, as shown more particularly in Figs. 2 and 6, each panel member 32 being in turn affixed by screws at its ends to upstanding sheet metal supports 33 integral with the cradle 11.

Referring to Fig. 6, each push-button assembly comprises a push-button 34a or 34b, projecting through an aperture in panel 32, and having its lower flanged end resiliently held against the panel by a contact spring 35, secured by means of insulated screws 36 to a metal strip 37, extending the length of panel 32 and common to an entire row of push-buttons, strip 37 being in turn affixed to the underside of panel 32 by means of insulated screws, such as 38, Fig. 3. Also assembled with each push-button by means of screws 36 is a terminal lug 39—in electrical contact with spring 35—and a spring contact lug 40, in electrical contact with strip 37, and arranged upon depression of the push-button to complete an electrical circuit from terminal lug 39 to strip 37. The bells or buzzers for the individual apartments are of course wired respectively between the individual terminal lugs 39 and the common strip 37, whereby depression of a given push-button operates but one bell or buzzer in accordance with the apartment selected.

To facilitate wiring the terminals 39, metal

"pig-tails," such as 41, are provided on the base of the cradle 11, whereby, as indicated in Fig. 3, the bell or buzzer wiring 42 entering the outlet box 10 and through an appropriate aperture in the wall thereof from the metal conduit 43 which supports the outlet box 10, may be extended through pig-tails 41 directly to the push-button terminal 39. Owing to this arrangement, the wiring may be extended and secured directly to the push-button terminals at the time the wiring is run through the conduit, as well as at any time prior to plastering and finishing the wall. Also it will be observed that owing to the exposed manner of mounting the terminal lugs 39, as shown more particularly in Fig. 1, no difficulty is encountered in the initial wiring or in changing the wiring without disturbing the push-button or cradle assembly.

For illuminating the directory strips from the underside of the panel, lamp sockets 45 into which lamps 46 are insertable are mounted on the base of the cradle. By employing push-buttons of translucent material, as at 34a in Fig. 6, the push-buttons as well as the directory indicia will be illuminated by lamps 46. Alternatively, opaque push-buttons may be employed, as at 34b in Fig. 6, and push-button illumination obtained by provision of light-transmitting slits in the panel adjacent thereto, as for example by interposing a strip of translucent material, as at 49, between the panel 12 and the strips 30 abutting the ends of the directory strips. The lamps are preferably provided with light shields 50 to prevent glare. Also the chassis and other appropriate interior parts are preferably coated with a light distributing paint, etc., for example, white or aluminum paint, so as to minimize the number of lamps required.

The panel may be provided with a hook 51 for supporting a telephone hand set 52, in which event the telephone cord 53 is extended through a hole 54 in the panel to an interior plug 55 insertable in a socket 56 mounted on the base of the chassis, whereby upon removal of the panel, the handset may also be quickly disconnected and removed with it.

I claim:

1. In a device of the character described: an open outlet box and a chassis adjustably attachable therein by means including overlapping flanges on said outlet box and chassis respectively, together with screws threaded through said chassis flanges and resting on said outlet box flanges, and other screws passing through enlarged apertures in said chassis flanges and threaded through said outlet box flanges, thereby to provide for both angular and elevational adjustment of said chassis with respect to said outlet box.

2. In a device of the character described: an open outlet box and a chassis adjustably attachable therein by means including overlapping flanges on said outlet box and chassis respectively, together with screws threaded through said chassis flanges and resting on said outlet box flanges, other screws passing through enlarged apertures in said chassis flanges and threaded through said outlet box flanges, thereby to provide for both angular and elevational adjustment of said chassis with respect to said outlet box, a panel covering for said outlet box, and means for attaching said cover to said chassis.

CHARLES AUTH.